United States Patent
Sung et al.

(10) Patent No.: US 12,209,027 B2
(45) Date of Patent: Jan. 28, 2025

(54) METHOD FOR ISOLATING LITHIUM PRECURSOR AND SYSTEM FOR ISOLATING LITHIUM PRECURSOR

(71) Applicant: SK INNOVATION CO., LTD., Seoul (KR)

(72) Inventors: Min Ji Sung, Daejeon (KR); Hyeon Bae Ha, Daejeon (KR); Ji Min Kim, Daejeon (KR); Sung Real Son, Daejeon (KR); Choon Hwan Song, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 624 days.

(21) Appl. No.: 17/613,226

(22) PCT Filed: Mar. 30, 2020

(86) PCT No.: PCT/KR2020/004296
§ 371 (c)(1),
(2) Date: Nov. 22, 2021

(87) PCT Pub. No.: WO2020/235802
PCT Pub. Date: Nov. 26, 2020

(65) Prior Publication Data
US 2022/0212942 A1 Jul. 7, 2022

(30) Foreign Application Priority Data
May 20, 2019 (KR) .................. 10-2019-0058661

(51) Int. Cl.
*C01D 15/02* (2006.01)
*B01D 11/02* (2006.01)
(Continued)

(52) U.S. Cl.
CPC .......... *C01D 15/02* (2013.01); *B01D 11/0253* (2013.01); *C01D 15/08* (2013.01); *H01M 10/54* (2013.01)

(58) Field of Classification Search
None
See application file for complete search history.

(56) References Cited

U.S. PATENT DOCUMENTS

| 4,565,660 A | 1/1986 | Hultholm et al. |
| 5,157,054 A | 10/1992 | Herbolzheimer et al. |

(Continued)

FOREIGN PATENT DOCUMENTS

| CN | 108091956 A | 5/2018 |
| EP | 1 760 821 A1 | 3/2007 |

(Continued)

OTHER PUBLICATIONS

European Search Report For EP20809833.5 issued on Jul. 1, 2022 from European patent office in a counterpart European patent application.

(Continued)

*Primary Examiner* — John J Figueroa
(74) *Attorney, Agent, or Firm* — The PL Law Group, PLLC

(57) ABSTRACT

A method for isolating a lithium precursor according to an embodiment of the present disclosure includes preparing a preliminary precursor mixture including a preliminary lithium precursor and a preliminary transition metal precursor, mixing the preliminary precursor mixture and a precipitation liquid in a reactor to form a precursor mixture, and injecting a non-reactive gas into the precursor mixture. Accordingly, the lithium precursor can be isolated with high yield and high efficiency.

19 Claims, 2 Drawing Sheets

(51) Int. Cl.
*C01D 15/08* (2006.01)
*H01M 10/54* (2006.01)

(56) References Cited

U.S. PATENT DOCUMENTS

| | | | |
|---|---|---|---|
| 9,570,751 B2* | 2/2017 | Cha | H01M 4/621 |
| 11,894,557 B2* | 2/2024 | Sun | H01M 4/382 |
| 2007/0111098 A1* | 5/2007 | Yang Kook | H01M 4/505 |
| | | | 429/231.95 |
| 2012/0068107 A1* | 3/2012 | Chung | C01G 53/42 |
| | | | 252/182.1 |
| 2016/0045841 A1* | 2/2016 | Kaplan | C01B 32/05 |
| | | | 429/49 |
| 2018/0280907 A1 | 10/2018 | Zhu et al. | |

FOREIGN PATENT DOCUMENTS

| | | |
|---|---|---|
| JP | H8-188418 A | 7/1996 |
| JP | 2001-23704 A | 1/2001 |
| JP | 2004-11010 A | 1/2004 |
| KR | 10-2012-0126946 A | 11/2012 |
| KR | 10-2014-0126943 A | 11/2014 |
| KR | 10-2015-0002963 A | 1/2015 |
| KR | 10-2015-0094412 A | 8/2015 |
| KR | 10-1682217 B1 | 12/2016 |
| KR | 10-2017-0118405 A | 10/2017 |
| KR | 10-1897134 B1 | 9/2018 |
| KR | 10-2019-0004096 A | 1/2019 |

OTHER PUBLICATIONS

Office action issued on Dec. 19, 2023 from Japan Intellectual Property Office in a counterpart Japanese Patent Application No. 2021-569226 (all the cited references are listed in this IDS.) (English translation is also submitted herewith.).

International Search Report for PCT/KR2020/004296 mailed on Jul. 6, 2020.

Office action issued on Oct. 20, 2023 from Korean Patent Office in a counterpart Korean Patent Application No. 10-2019-0058661. (English translation is also submitted herewith.).

* cited by examiner

METHOD FOR ISOLATING LITHIUM PRECURSOR AND SYSTEM FOR ISOLATING LITHIUM PRECURSOR

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2020/004296, filed Mar. 30, 2020, which claims priority to the benefit of Korean Patent Application No. 10-2019-0058661 filed in the Korean Intellectual Property Office on May 20, 2019, the entire contents of which are incorporated herein by reference.

BACKGROUND

1. Technical Field

The present invention relates to a method for isolating lithium precursor and a system for isolating a lithium precursor. More particularly, the present invention relates to a method and a system for isolating a lithium precursor from a preliminary precursor mixture.

2. Background Art of the Invention

A secondary battery which can be charged and discharged repeatedly has been widely employed as a power source of a mobile electronic device such as a camcorder, a mobile phone, a laptop computer, etc., according to developments of information and display technologies. The secondary battery includes, e.g., a lithium secondary battery, a nickel-cadmium battery, a nickel-hydrogen battery, etc. The lithium secondary battery is actively developed and applied due to high operational voltage and energy density per unit weight, a high charging rate, a compact dimension, etc.

The lithium secondary battery may include an electrode assembly including a cathode, an anode and a separation layer (a separator), and an electrolyte immersing the electrode assembly. The lithium secondary battery may further include an outer case having, e.g., a pouch shape for accommodating the electrode assembly and the electrolyte.

A lithium metal oxide may be used as a cathode active material of the lithium secondary battery. The lithium metal oxide may additionally contain a transition metal such as nickel, cobalt and manganese.

The lithium metal oxide as the cathode active material may be prepared by reacting a lithium precursor and a nickel-cobalt-manganese (NCM) precursor containing nickel, cobalt and manganese.

As the above-described high-cost valuable metals are used in the cathode active material, an excessive cost is required in a manufacture of the cathode active material. Additionally, as environmental protection issues have been recently highlighted, a recycling method of the cathode active material has been researched. For the recycle of the cathode active material, a regeneration of the lithium precursor is needed from a used cathode with high efficiency and high yield.

For example, Korean Published Patent Application No. 2015-0002963 discloses a method for recovering lithium using a wet method. However, lithium is recovered by wet extraction from a waste liquid remaining after extracting cobalt, nickel, etc., and thus a recovery ratio may be excessively reduced, and a large number of impurities may be generated from the waste liquid.

SUMMARY

According to an aspect of the present invention, there is provided a method for isolating a lithium precursor with high efficiency and high purity.

According to an aspect of the present invention, there is provided a system for isolating a lithium precursor with high efficiency and high purity.

In a method for isolating a lithium precursor according to exemplary embodiments, a preliminary precursor mixture including a preliminary lithium precursor and a preliminary transition metal precursor is prepared. The preliminary precursor mixture and a precipitation liquid are mixed in a reactor to form a precursor mixture. A non-reactive gas is injected into the precursor mixture.

In some embodiments, the reactor may be a fluidized bed reactor.

In some embodiments, the preliminary precursor mixture may be prepared by performing a reductive reaction of a cathode active material collected from a lithium secondary battery.

In some embodiments, the reductive reaction may be performed before forming the precursor mixture in the reactor.

In some embodiments, the preliminary lithium precursor may include lithium hydroxide.

In some embodiments, the preliminary lithium precursor may further include lithium oxide or lithium carbonate.

In some embodiments, the precursor mixture may be formed by selectively dissolving lithium hydroxide in the precipitation liquid.

In some embodiments, the precipitation liquid may include water.

In some embodiments, the precipitation liquid may further include dimethyl carbonate or diethyl carbonate.

In some embodiments, a mass of the precipitation liquid in the precursor mixture may be 2 to 20 times a mass of the preliminary lithium precursor.

In some embodiments, the precursor mixture may include a slurry or a solution containing the preliminary precursor mixture.

In some embodiments, injecting the non-reactive gas into the precursor mixture may include a pulse injection of the non-reactive gas.

In some embodiments, a solubility of the non-reactive gas in the precipitation liquid may be 1.5 g/L or less.

In some embodiments, the non-reactive gas may include at least one selected from the group consisting of nitrogen, neon, argon, krypton and xenon.

In some embodiments, the non-reactive gas may be injected into a lower portion of the reactor.

In some embodiments, injecting the non-reactive gas may include reducing a linear velocity of the non-reactive gas at an upper portion top of the reactor.

In some embodiments, the linear velocity of the non-reactive gas may be reduced to 0.1 to 3 cm/s.

In some embodiments, the upper portion of the reactor may include an expansion unit having an expanded diameter or width.

In some embodiments, forming the precursor mixture and injecting the non-reactive gas may be repeatedly performed in a plurality of cycles.

A system for isolating a lithium precursor according to exemplary embodiments includes a reactor body into which a lithium precursor is introduced, a precipitation liquid injection unit for injecting a precipitation liquid into the reactor body, and a gas injection unit for injecting a non-reactive gas into a lower portion of the reactor body, and an expansion unit extending from an upper portion of the reactor body and having an expanded diameter or width.

According to the above-described exemplary embodiments, a preliminary precursor mixture including a preliminary lithium precursor and a preliminary transition metal precursor, and a precipitation liquid may be mixed in a reactor to form a precursor mixture, and a non-reactive gas may be injected into the precursor mixture to separate a lithium precursor with high purity and high efficiency.

The non-reactive gas may disperse the preliminary precursor mixture in the precipitation liquid, thereby selectively dissolving the lithium precursor including lithium hydroxide in the precipitation liquid. Additionally, the preliminary transition metal precursor not dissolved in the precipitation liquid may be precipitated.

Accordingly, the lithium precursor may be only isolated selectively from the preliminary precursor mixture.

DETAILED DESCRIPTION

According to exemplary embodiments of the present invention, there is provided a method and a system for isolating a lithium precursor where a preliminary precursor mixture and a precipitation liquid are mixed in a reactor to form a precursor mixture, and injecting a non-reactive gas into the precursor mixture to separate the lithium precursor with high efficiency and high purity.

Hereinafter, embodiments of the present invention will be described in detail with reference to the accompanying drawings. However, the embodiments are provided as exemplary examples, and the spirit of the present invention are not limited to those specific embodiments.

The term "precursor" in the present specification is used to generically refer to a compound containing a specific metal to provide the specific metal included in an electrode active material.

Figure 1:
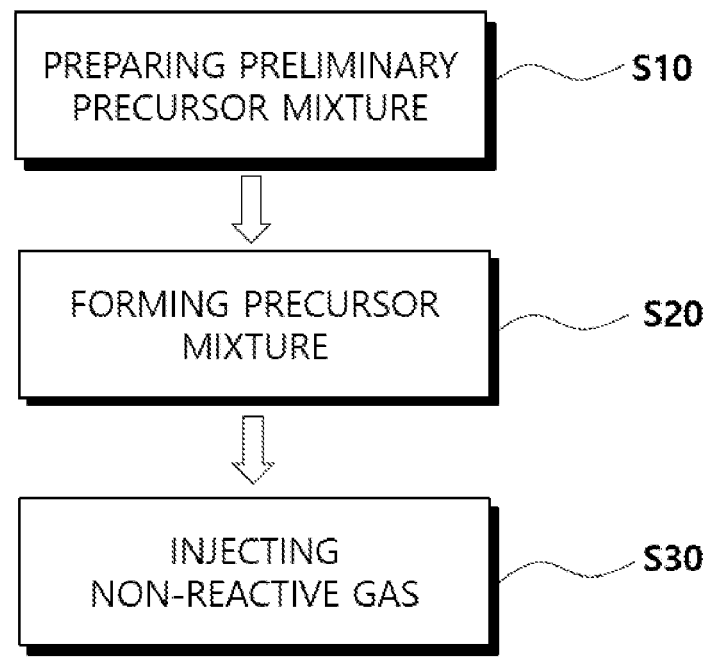
FIG. 1 is a process flow diagram illustrating a method of isolating a lithium precursor in accordance with exemplary embodiments.
Figure 2:
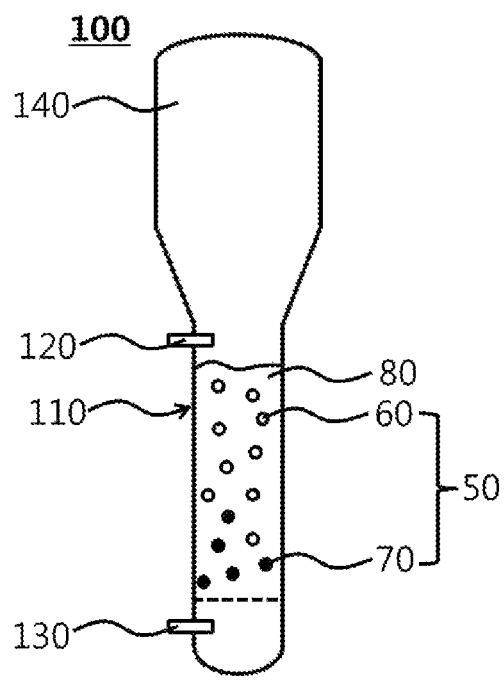
FIG. 2 is a schematic diagram for describing a system for isolating a lithium precursor in accordance with exemplary embodiments.

FIG. 1 is a process flow diagram illustrating a method of isolating a lithium precursor in accordance with exemplary embodiments. FIG. 2 is a schematic diagram for describing a system for isolating a lithium precursor in accordance with exemplary embodiments.

Hereinafter, a method and a system for isolating a lithium precursor are described together with reference to FIGS. 1 and 2.

Referring to FIG. 1, a preliminary precursor mixture including a preliminary lithium precursor and a preliminary transition metal precursor may be prepared (e.g., in a step of S10).

In exemplary embodiments, the preliminary precursor mixture including the preliminary lithium precursor and the preliminary transition metal precursor may be obtained from a cathode active material mixture collected from a lithium secondary battery. For example, the cathode active material mixture may be obtained from a lithium-containing compound obtained from the lithium secondary battery.

The lithium secondary battery may include an electrode assembly including a cathode, an anode and a separation layer interposed between the cathode and the anode. The cathode and the anode may include a cathode active material layer and an anode active material layer coated on a cathode current collector and an anode current collector, respectively.

For example, a cathode active material included in the cathode active material layer may include an oxide containing lithium and a transition metal.

In some embodiments, the cathode active material may include a compound represented by Chemical Formula 1 below.

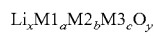  [Chemical Formula 1]

$Li_xM1_aM2_bM3_cO_y$          [Chemical Formula 1]

In Chemical Formula 1, M1, M2 and M3 may each be a transition metal selected from Ni, Co, Mn, Na, Mg, Ca, Ti, V, Cr, Cu, Zn, Ge, Sr, Ag, Ba, Zr, Nb, Mo, Al, Ga or B. In Chemical Formula 1, $0 \leq x \leq 1.1$, $2 \leq y \leq 2.02$, $0<a<1$, $0<b<1$, $0<c<1$, and $0<a+b+c \leq 1$.

In some embodiments, the cathode active material may be an NCM-based lithium oxide containing nickel, cobalt and manganese. The NCM-based lithium oxide as the cathode active material may be prepared by reacting the lithium precursor and an NCM precursor (e.g., an NCM oxide) with each other through, e.g., a co-precipitation reaction.

However, embodiments of the present invention may be commonly applied not only to the cathode material including the NCM-based lithium oxide, but also to a lithium-containing electrode material.

The lithium precursor may include lithium hydroxide (LiOH), lithium oxide ($Li_2O$) or lithium carbonate ($Li_2CO_3$). Lithium hydroxide may be advantageous as the lithium precursor in an aspect of a charge/discharge property, a life-span property, a high temperature stability, etc., of the lithium secondary battery. For example, lithium carbonate may cause an immersion reaction on the separation layer, thereby reducing life-span stability.

Accordingly, according to embodiments of the present invention, a method of isolating lithium hydroxide as the lithium precursor with high selectivity may be provided.

For example, the cathode may be separated and recovered from the lithium secondary battery. The cathode may include the cathode current collector (e.g., aluminum (Al)) and the cathode active material layer, and the cathode active material layer may include a conductive material and a binder together with the above-described cathode active material.

The conductive material may include, e.g., a carbon-based material such as graphite, carbon black, graphene, carbon nanotube, etc. The binder may include a resin material such as vinylidene fluoride-hexafluoropropylene copolymer (PVDF-co-HFP), polyvinylidenefluoride (PVDF), polyacrylonitrile, polymethyl methacrylate, etc.

A cathode active material mixture may be prepared from the recovered cathode. In some embodiments, the cathode active material mixture may be prepared in a powder form through a physical method such as a grinding treatment. The cathode active material mixture may include a powder of a lithium-transition metal oxide, and may include, e.g., an NCM-based lithium oxide powder (e.g., $Li(NCM)O_2$).

In some embodiments, the cathode active material mixture may be heat-treated before the grinding treatment. In this case, the cathode current collector may be more easily detached from the cathode before the grinding treatment, and the binder and the conductive material may be removed.

For example, a temperature of the heat treatment may be in a range from about 100° C. to about 500° C., preferably in a range from about 350° C. to about 450° C.

In some embodiments, the cathode active material mixture may be obtained after immersing the recovered cathode in an organic solvent. For example, the recovered cathode may be immersed in the organic solvent to separate and remove the cathode current collector, and the cathode active material may be selectively extracted by a centrifugation.

By the above-described processes, the cathode current collector component such as aluminum may be substantially completely separated and removed, and the cathode active material mixture from which a content of carbon-based components derived from the conductive material and the binder may be removed or reduced may be obtained.

In some embodiments, the preliminary precursor mixture may be generated by reducing the cathode active material mixture (e.g., the cathode active material). For example, the preliminary precursor mixture may be formed by reducing the cathode active material mixture with hydrogen.

The hydrogen reductive reaction may be performed at a temperature from about 350 to about 700° C., preferably from about 400 to about 550° C.

The preliminary precursor mixture may include the preliminary lithium precursor and the preliminary transition metal precursor that may be products from the hydrogen reductive reaction of the lithium-transition metal oxide included in the cathode active material mixture.

The preliminary lithium precursor may include lithium hydroxide, lithium oxide and/or lithium carbonate. In exemplary embodiments, the preliminary lithium precursor may be obtained through the hydrogen reductive reaction, so that a mixed content of lithium carbonate may be decreased.

The preliminary transition metal precursor may include Ni, Co, NiO, CoO, MnO, or the like.

For example, the preliminary precursor mixture formed from the above-described reductive reaction may be transferred to a reactor 100 as will be described later.

In some embodiments, the reductive reaction may be performed in the reactor 100 in which a reaction for forming a precursor mixture of a preliminary precursor mixture 50 and a precipitation liquid 80 may be performed as described later. In this case, the precursor mixture forming reaction may be performed without transferring the preliminary precursor mixture. Accordingly, the yield reduction caused while transferring the preliminary precursor mixture may be prevented.

Referring to FIGS. 1 and 2 together, the preliminary precursor mixture 50 and the precipitation liquid 80 may be mixed in the reactor 100 to form the precursor mixture (e.g., in a step of S20).

For example, the precursor mixture may refer to a composition including a lithium precursor formed by reacting a preliminary lithium precursor 60 with the precipitation liquid 80 and a preliminary transition metal precursor 70 precipitated in the precipitation liquid 80.

In some embodiments, the reactor 100 may be a fluidized bed reactor. For example, the fluidized bed reactor may refer to a reactor in which a fluid (gas or liquid) flows through the injected preliminary precursor mixture 50 to induce a fluidization. For example, the fluid may be a non-reactive gas as will be described later.

For example, the preliminary precursor mixture 50 may be fluidized in the fluidized bed reactor so that a contact area with the precipitation liquid 80 may be increased. Accordingly, the reaction between the preliminary lithium precursor 60 and the precipitation liquid 80 may be more promoted.

Additionally, the preliminary transition metal precursor 70 precipitated in the precipitation liquid 80 may be formed in a state of a slurry to be easily transferred to a subsequent reactor.

Referring to FIG. 2, the precipitation liquid 80 may be injected into the reactor 100 through a precipitation liquid injection unit 120. The precipitation liquid 80 may be injected into a reactor body 110 through the precipitation liquid injection unit 120.

For example, the precipitation liquid injection unit 120 may be located at an upper portion of the reactor body 110. The precipitation liquid injection unit 120 may be located at a lower portion or a middle portion of the reactor body 110.

In some embodiments, the preliminary lithium precursor may include lithium hydroxide. In some embodiments, the preliminary lithium precursor may further include lithium oxide or lithium carbonate.

In some embodiments, the precursor mixture may be formed by dissolving the preliminary lithium precursor 60 in the precipitation liquid 80.

For example, lithium hydroxide contained in the preliminary lithium precursor 60 may be selectively dissolved in the precipitation liquid 80 to form the precursor mixture. For example, lithium oxide may react with the precipitation liquid 80 to form lithium hydroxide, and then may be dissolved in the precipitation liquid 80. For example, lithium carbonate may have low solubility in the precipitation liquid 80. Accordingly, lithium carbonate may be precipitated and removed from the preliminary precursor mixture.

In some embodiments, the precipitation liquid 80 may include water. For example, the preliminary lithium precursor 60 may be hydrated with water to form the precursor mixture including an aqueous solution in which lithium hydroxide is dissolved.

In some exemplary embodiments, the precipitation liquid may further include dimethyl carbonate or diethyl carbonate.

For example, dimethyl carbonate or diethyl carbonate may promote the reaction between the preliminary lithium precursor 60 and water. Accordingly, an isolation efficiency of the lithium precursor may be improved.

In some embodiments, a mass of the precipitation liquid 80 in the precursor mixture may be about 2 to 20 times a mass of the preliminary lithium precursor 60, preferably about 2 to 10 times a mass of the preliminary lithium precursor 60.

For example, in the above range, mixing of the preliminary lithium precursor 60 and the precipitation liquid 80 by a non-reactive gas as will be described later may be easily performed. Accordingly, the lithium precursor may be separated with high purity and high efficiency without using an excessive amount of the precipitation liquid.

In some embodiments, the precursor mixture may include a slurry or a solution including the preliminary precursor mixture 50.

For example, the preliminary transition metal precursor 70 that may not be soluble in the precipitation liquid 80 may be dispersed in the precipitation liquid 80 to form the slurry. For example, lithium hydroxide contained in the preliminary lithium precursor 60 may be dissolved in the precipitation liquid 80 to form the solution. Accordingly, the preliminary transition metal precursor 70 and the preliminary lithium precursor 60 may be separated from each other.

Referring to FIGS. 1 and 2, a non-reactive gas may be injected into the precursor mixture (e.g., in a step of S30). For example, the non-reactive gas may be injected into the precursor mixture located at an inside of the reactor 100 through a gas injection unit 130.

For example, the non-reactive gas may be injected into the precursor mixture to promote mixing of the preliminary precursor mixture 50 and the precipitation liquid 80.

For example, the non-reactive gas may apply a physical impact to an agglomerated preliminary precursor mixture 50, so that the preliminary precursor mixture 50 may be uniformly dispersed in the precipitation liquid 80.

Accordingly, a contact area between the precipitation liquid 80 and the preliminary precursor mixture 50 may be increased, so that the precursor mixture may be more easily formed.

In some embodiments, a pulse of the non-reactive gas may be injected into the precursor mixture. The pulse of the non-reactive gas may include a change with a constant period of an injection rate or an injection amount of the non-reactive gas. For example, a type of the pulse may be appropriately selected according to capacity and shape of the reactor 100.

In some exemplary embodiments, a solubility of the non-reactive gas in the precipitation liquid 80 may be 1.5 g/L or less. A low solubility of the non-reactive gas in the precipitation liquid may be advantageous, and a lower limit of the solubility is not particularly limited.

In some exemplary embodiments, the non-reactive gas may include at least one selected from the group consisting of nitrogen, neon, argon, krypton and xenon which may have low solubility and reactivity with respect to the precipitation liquid.

In this case, a loss of the non-reactive gas caused when the non-reactive gas is dissolved in the precipitation liquid may be prevented. Further, the non-reactive gas may not react with the precursor mixture, so that a yield reduction of the lithium precursor due to a side reaction may be prevented.

In some embodiments, the non-reactive gas may not include carbon dioxide ($CO_2$). Accordingly, the reduction the yield reduction of the lithium precursor due to a reaction between carbon dioxide and lithium hydroxide may be prevented.

In some embodiments, the non-reactive gas may be injected into the lower portion of the reactor 100. For example, the non-reactive gas may be injected into the precursor mixture through the gas injection unit 130 positioned at the lower portion of the reactor 100.

The non-reactive gas injected into the lower portion of the reactor 100 may rise to the upper portion of the reactor 100 to promote mixing of the preliminary precursor mixture 50 and the precipitation liquid 80 throughout the reactor body 110.

In some embodiments, a linear velocity (cm/s) of the non-reactive gas injected into the precursor mixture may be from about 5 to 30 cm/s.

In the above range, the non-reactive gas may provide sufficient physical impact on the aggregated preliminary precursor mixture 50, so that the mixing of the preliminary precursor mixture 50 and the precipitation liquid 80 may be further promoted.

In some embodiments, the non-reactive gas may have a reduced linear velocity (cm/s) at the upper portion of the reactor 100. For example, the linear velocity may refer to a flow rate of a gas passing through per unit area.

For example, a mass of each particle of the preliminary precursor mixture 50 included in the reactor 100 may be different from each other. In this case, the particles of the preliminary precursor mixture 50 having a relatively small mass may flow out of the reactor body 110 by the non-reactive gas or may be precipitated in the upper portion of the reactor 100.

Therefore, the linear velocity (cm/s) of the non-reactive gas may be reduced at the upper portion of the reactor 100, so that the preliminary precursor mixture 50 may be effectively prevented from flowing out of the reactor body 110 or from being precipitated on the upper portion of the reactor 100.

In some embodiments, the linear velocity of the non-reactive gas at the upper portion of the reactor 100 may be reduced to about 0.1 to 3 cm/s. For example, the linear velocity of the non-reactive gas in an expansion unit 140 located at the upper portion of the reactor body 110 may be reduced to about 0.1 to 3 cm/s.

In the above range, the preliminary precursor mixture 50 may be prevented from flowing out of the reactor body 110, while further promoting the mixing of the preliminary precursor mixture 50 and the precipitation liquid 80.

For example, the reactor 100 may include the expansion unit 140 extending from the upper portion of the reactor body 110 and having a larger diameter than that of the reactor body 110.

For example, the expansion unit 140 may have a larger cross-sectional area than that of the reactor body 110, so that the linear velocity (cm/s) of the non-reactive gas moving from the reactor body 110 to the expansion unit 140 may be reduced. In this case, a ratio of a diameter of the expansion unit 140 to a diameter of the reactor body 110 may be adjusted, and thus a reduction ratio of the linear velocity (cm/s) may be easily adjusted.

In some embodiments, the ratio of the diameter of the expansion unit 140 to the diameter of the reactor body 110 may be from 2 to 10.

In the above diameter ratio range, the preliminary precursor mixture 50 may be more effectively prevented from flowing out of the reactor body 110.

In some exemplary embodiments, the formation of the precursor mixture and the injection of the non-reactive gas may be repeatedly performed in a plurality of cycles.

For example, separation efficiency and yield of the lithium precursor may be improved by repeatedly forming the precursor mixture and injecting the non-reactive gas.

For example, the formation of the precursor mixture and the injection of the non-reactive gas may be repeatedly performed, so that a content of the lithium precursor remaining undissolved in the precipitation liquid 80 may be reduced. Accordingly, the yield of the lithium precursor may be further improved.

For example, while repeatedly forming the precursor mixture and injecting the non-reactive gas, an injected amount of the precipitation liquid 80 and the non-reactive gas may be properly adjusted based on the solubility of the preliminary lithium precursor in the precipitation liquid 80 and the capacity of the reactor 100.

For example, the injected amount of the precipitation liquid 80 and the non-reactive gas may be constant, or may be constantly increased or decreased as a plurality of the cycles are repeated.

In an embodiment, the precipitated preliminary transition metal precursor 70 may be collected from the reactor 100 to form a transition metal precursor. For example, the preliminary transition metal precursor 70 may react with an acid solution to form the transition metal precursor.

In an embodiment, sulfuric acid may be used as the acid solution. In this case, the transition metal precursor may include a transition metal sulfate. For example, the transition metal sulfate may include $NiSO_4$, $MnSO_4$, $CoSO_4$, etc.

What is claimed is:

1. A method for isolating a lithium precursor, comprising:
preparing a preliminary precursor mixture including a preliminary lithium precursor and a preliminary transition metal precursor;
mixing the preliminary precursor mixture and a precipitation liquid in a reactor to form a precursor mixture; and
injecting a non-reactive gas into the precursor mixture, wherein injecting the non-reactive gas comprises reducing a linear velocity of the non-reactive gas at an upper portion top of the reactor.

2. The method according to claim 1, wherein the reactor is a fluidized bed reactor.

3. The method according to claim 1, wherein preparing the preliminary precursor mixture comprises performing a reductive reaction of a cathode active material collected from a lithium secondary battery.

4. The method according to claim 3, wherein the reductive reaction is performed before forming the precursor mixture in the reactor.

5. The method according to claim 1, wherein the preliminary lithium precursor comprises lithium hydroxide.

6. The method according to claim 5, wherein the preliminary lithium precursor further comprises lithium oxide or lithium carbonate.

7. The method of claim 6, wherein forming the precursor mixture comprises selectively dissolving lithium hydroxide in the precipitation liquid.

8. The method of claim 1, wherein the precipitation liquid comprises water.

9. The method of claim 8, wherein the precipitation liquid further comprises dimethyl carbonate or diethyl carbonate.

10. The method according to claim 1, wherein a mass of the precipitation liquid in the precursor mixture is 2 to 20 times a mass of the preliminary lithium precursor.

11. The method according to claim 1, wherein the precursor mixture comprises a slurry or a solution containing the preliminary precursor mixture.

12. The method according to claim 1, wherein injecting the non-reactive gas comprises a pulse injection of the non-reactive gas.

13. The method according to claim 1, wherein a solubility of the non-reactive gas in the precipitation liquid is 1.5 g/L or less.

14. The method according to claim 1, wherein the non-reactive gas includes at least one selected from the group consisting of nitrogen, neon, argon, krypton and xenon.

15. The method according to claim 1, wherein the non-reactive gas is injected into a lower portion of the reactor.

16. The method according to claim 1, wherein reducing the linear velocity of the non-reactive gas comprises reducing the linear velocity of the non-reactive gas to 0.1 to 3 cm/s.

17. The method according to claim 1, wherein the upper portion of the reactor includes an expansion unit having an expanded diameter or width.

18. The method according to claim 1, wherein forming the precursor mixture and injecting the non-reactive gas are repeatedly performed in a plurality of cycles.

19. A system for isolating a lithium precursor, comprising:
a reactor body into which a lithium precursor is introduced;
a precipitation liquid injection unit for injecting a precipitation liquid into the reactor body;
a gas injection unit for injecting a non-reactive gas into a lower portion of the reactor body, wherein the gas injection unit is configured for reducing a linear velocity of the non-reactive gas at an upper portion top of the reactor; and
an expansion unit extending from an upper portion of the reactor body and having an expanded diameter or width.

* * * * *